(12) United States Patent
Yang (10) Patent No.: US 8,371,620 B1
(45) Date of Patent: Feb. 12, 2013

(54) QUICK CONNECTOR

(76) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 13/240,294

(22) Filed: Sep. 22, 2011

(51) Int. Cl.
*F16L 37/00* (2006.01)

(52) U.S. Cl. .................................... 285/320; 285/305

(58) Field of Classification Search .............. 285/305, 285/320, 921
See application file for complete search history.

(56) References Cited

U.S. PATENT DOCUMENTS

| | | | |
|---|---|---|---|
| 4,904,000 A * | 2/1990 | Matsui | 285/305 |
| 4,919,462 A * | 4/1990 | Matsui et al. | 285/305 |
| 5,330,235 A * | 7/1994 | Wagner et al. | 285/320 |
| 5,401,063 A * | 3/1995 | Plosz | 285/320 |
| 5,447,337 A * | 9/1995 | Ruckwardt | 285/320 |
| 5,951,063 A | 9/1999 | Szabo | |
| 6,142,537 A * | 11/2000 | Shimada et al. | 285/320 |
| 6,254,145 B1* | 7/2001 | Schwarz et al. | 285/903 |
| 6,523,864 B1* | 2/2003 | Discher et al. | 285/320 |
| 6,612,622 B2 | 9/2003 | Andre et al. | 285/305 |
| 6,755,675 B2* | 6/2004 | Szabo et al. | 439/191 |
| 6,916,050 B2* | 7/2005 | Milhas | 285/320 |
| 7,029,036 B2* | 4/2006 | Andre | 285/305 |
| 7,036,850 B2* | 5/2006 | Gill | 285/320 |
| 7,547,048 B2* | 6/2009 | Catlow | 285/305 |

FOREIGN PATENT DOCUMENTS

TW 268559 1/1996

* cited by examiner

*Primary Examiner* — David E Bochna
(74) *Attorney, Agent, or Firm* — Muncy, Geissler, Olds & Lowe, PLLC (57) ABSTRACT

A quick connector includes a female adapter and at least a retainer. The female adapter has a joint portion and an axial hole. The axial hole is adapted for a male adapter inserting therein. The joint portion has an opening and at least a pair of engaging recesses. The opening communicates with the axial hole. The engaging recess has a narrow section and a broad section. The retainer includes a pair of pivot members positioned in a predetermined position of the broad section of the engaging recess so that the retainer may pivot between a clamping position and a spreading position. The present invention can accomplish the purpose of engaging the male adapter or dismantling fast with the pivoting retainer. The retainer is selectively positioned in the predetermined position of the engaging recess so that the retainer may be installed or detached easily, and be prevented from missing.

9 Claims, 8 Drawing Sheets

QUICK CONNECTOR

BACKGROUND OF THE INVENTION

1. Field of the Invention

The present invention relates to a quick connector which is adapted for a male adapter of an apparatus inserting therein.

2. Description of the Prior Art

A typical quick connector is disposed at one end of a pipe and adapted for a male adapter of an apparatus to be connected with the pipe quickly. A conventional quick connector, as disclosed in TW 268559, comprises a retainer which is detachably received in a recess of the joint portion. A clamping end of the retainer engages in an embedded groove of the male adapter. Whereby the male adapter is able to be smoothly connected to the pipe firmly so that the male adapter may not loosen and separate from the pipe.

However, after said retainer engages the male adapter, the retainer detaches from the male adapter difficultly. Users have to take great pains to remove the C-shaped retainer from the embedded groove of the male adapter. Moreover, in the removing process, the retainer could be deformed seriously, even broken. Furthermore, the C-shaped retainer is quite lighter, thinner, and smaller. When users take it out, it would separate from the recess of the joint portion completely. The users must put it away carefully, otherwise it would be lost easily.

There is a conventional quick connector, as disclosed in U.S. Pat. No. 5,951,063, can resolve said problem. Its retainer has some, such as engaging the male adapter and separating from the same quickly. Besides, the retainer could not separate from the joint portion. However, when the retainer is disengaged from the male adapter, the male adapter has to move to some particular angle so as to be removed from the quick connector. However, the said detaching means is so inefficient that users waste much time and energy to detach the retainer from the male adapter. Moreover, the detaching means operates difficultly.

SUMMARY OF THE INVENTION

The main object of the present invention is to provide a quick connector which comprises a retainer. The retainer can quickly engage the male adapter and disengage from the same by pivoting means.

Another object of the present invention is to provide a quick connector which comprises a retainer. The retainer is selectively positioned in a predetermined position of the joint portion so as to be installed and dismantled easily.

To achieve the above, the quick connector of the present invention is adapted for a male adapter to connect thereto. The quick connector comprises a female adapter and at least a retainer. The female adapter has a joint portion at one end thereof. The female adapter is formed with an axial hole. The axial hole is adapted for the male adapter inserting therein. The joint portion has an outer contour and an inner contour. The joint portion is formed with an opening. The opening extends radially and passes through the outer contour and the inner contour so that the opening is communicated with the axial hole. Wherein, the inner contour of the joint portion has at least a limiting groove. And the retainer is pivotally disposed on the joint portion. The retainer comprises an inner arm and an outer arm. The outer arm comprises a hook portion. Wherein, the retainer is capable of pivoting about an axis with respect to the joint portion. The retainer pivots between a clamping position and a spreading position. When the retainer is located in the clamping position. The retainer is located in the opening of the joint portion. The inner arm engages the male adapter. The hook portion hooks in the limiting groove. When the hook portion is away from the limiting groove, the retainer is capable of pivoting to the spreading position so that the inner arm is separated from the male adapter.

Wherein, the outer contour of the joint portion is formed with at least a pair of engaging recesses. The pair of engaging recesses is communicated with the opening of the joint portion. The retainer comprises a pair of pivot members. The pair of pivot members is positioned in a predetermined position of the engaging recesses. Wherein each engaging recess has a narrow section and a broad section. The narrow section is communicated between the broad section and the outer contour of the joint portion. An outer diameter of the pivot member is as wide as an inner diameter of the broad section. After the pivot member passes through one of the narrow section, the pivot member is positioned in a predetermined position of one of the narrow section.

As such, the present invention can engage the male adapter and disengage from the same quickly with the retainer by pivoting means. The retainer is selectively positioned in the predetermined position of the engaging recesses so as to be installed and dismantled easily. Furthermore, the retainer would not be lost easily.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 5. A quick connector of the present invention is disposed on an additional pipe (not shown). The quick connector is adapted for a male adapter 11 to connect thereto. More specifically, the male adapter 11 is disposed on an apparatus 10. The male adapter 11 is connected to the additional pipe so that the apparatus 10 may communicate with another apparatus (not shown). Whereby gas or liquid in one of the apparatus can flow into another one. In the first embodiment of the present invention, the apparatus 10 is a faucet control valve. The male adapter 11 is formed on the control valve integrally. The male adapter 11 comprises a blocking rim 111. The quick connector comprises a female adapter 20 and at least a retainer 30.

The female adapter 20 has a joint portion 21 and a connecting tube 22. The joint portion 21 is disposed at one end of the female adapter 20. The connecting tube 22 is disposed at the other end of the female adapter 20. The connecting tube 22 can insert into the additional pipe direct. In another embodiment, the connecting tube 22 can be the additional pipe direct so as to connect to another apparatus. Wherein the female adapter 20 is formed with an axial hole 23 which is adapted for the male adapter 11 inserting therein. The blocking rim 111 leans against one end of the connecting tube 22. The joint portion 21 has an outer contour 211 and an inner contour 212. The joint portion 21 is formed with an opening 213. In the present embodiment, the joint portion 21 is formed with two openings 213 which respectively extend radially and pass through the outer contour 211 and the inner contour 212 so that the openings 213 are communicated with the axial hole 23 respectively. Besides, the outer contour 211 of the joint portion 23 is formed with at least a pair of engaging recesses 214. In the present embodiment, the joint portion 23 is formed with two pairs of engaging recesses 214. Each pair of engaging recesses 214 is communicated with one of the openings 213 respectively. Preferably, each engaging recess 214 has a narrow section 214a and a broad section 214b. The narrow section 214a is communicated between the broad section 214b and the outer contour 211 of the joint portion. Moreover, the inner contour 212 of the joint portion has at least a limiting groove 212a. In the present embodiment, the joint portion is formed with two limiting grooves 212a. More clearly, the amount of the limiting groove 212a corresponds to the amount of the retainer 30.

The retainer 30 is pivotally disposed on the joint portion 21. The retainer 30 comprises an inner arm 31, an outer arm 32, a pair of pivot members 33, and a plurality of connecting portions 34. The inner arm 31 is arc-formed, and so is the outer arm 32. The outer arm is L-shaped or other shape as well. Wherein the outer arm 32 comprises a hook portion 321 and a bump 322. The bump 322 is protrusive from a side of the outer arm 32 where is away from the inner arm 31. The inner arm 31 is formed with a first arc section and a second arc section. The first arc section has a first concave surface 31a at a side of the first arc section where is away from the outer arm 32. The second arc section has a second concave surface 31b at a side of the second arc section where is away from the outer arm 32. The first and the second concave surfaces 31a and 31b are eccentric so that a protrusive portion 31c is formed between the first and the second arc sections. The protrusive portion 31c extends away from the outer arm 32. The pair of pivot members 33 is located between a fixed end of the outer arm 32 and a fixed end of the inner arm 31. More specifically, the pair of pivot members 33 is disposed between the fixed end of the outer arm 32 and an end of the second arc section. The other end of the second arc section is connected to an end of the first arc section. Wherein the pair of pivot members 33 is positioned in a predetermined position of one of the pair of engaging recesses 214. The connecting portions 34 are connected between the inner arm 31 and the outer arm 32. Whereby the connecting portions 34 make the structure intensity of the retainer stronger so that the inner arm and the outer arm can recover their shape at any time. Preferably, at least a recess space 341 is formed between any two of connecting portions 34 which are adjacent to each other. In the present embodiment, two recess spaces 341 are formed between any two of connecting portions 34 which are adjacent to each other. The recess spaces 341 are not communicating with each other. In another possible embodiment, the recess spaces 341 can also pass through both side of the retainer so that the recess spaces 341 are hollow. When the connecting portions keep the structure intensity of the retainer up, manufacturer can design said recess spaces to achieve the purpose of reducing production costs. Moreover, the quick connector further comprises another retainer 30 which is pivotally disposed on the joint portion 21. Another retainer 30 has the same structure as the said retainer 30. The another retainer 30 is positioned in a predetermined position of the other pair of engaging recesses.

Figure 1:
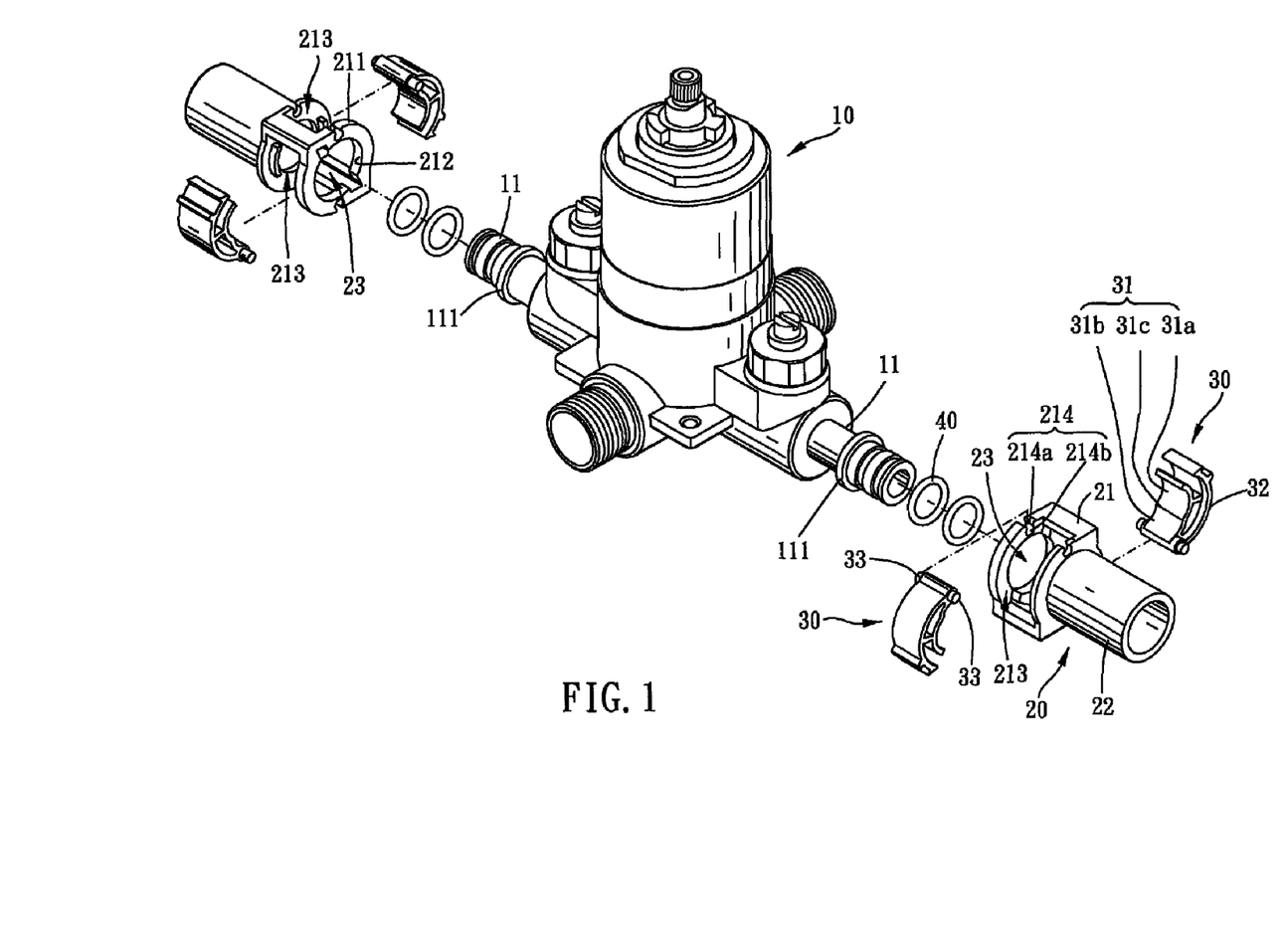
FIG. 1 is a breakdown drawing in accordance with the first embodiment of the present invention.
Figure 2:
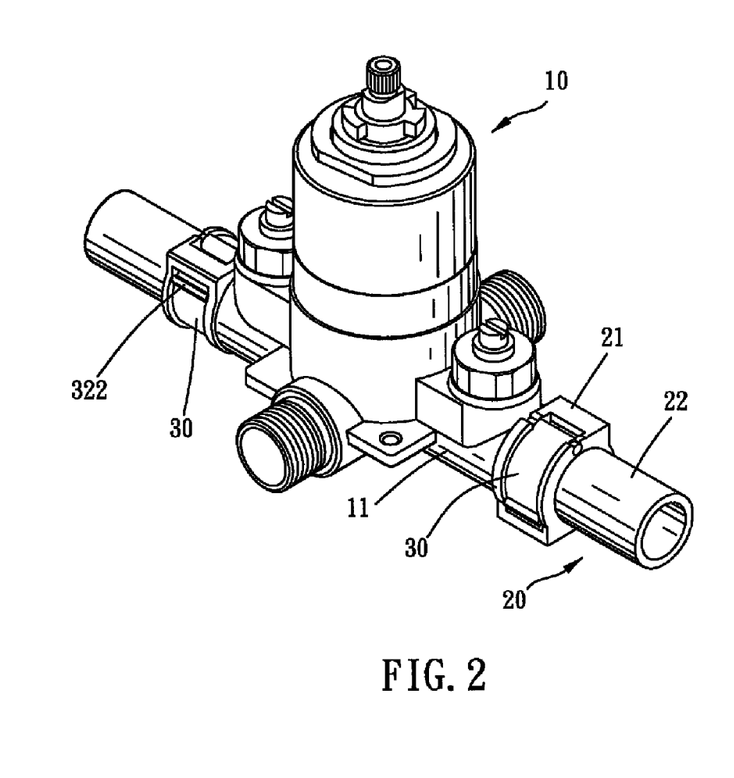
FIG. 2 is a stereogram in accordance with the first embodiment of the present invention.
Figure 3:
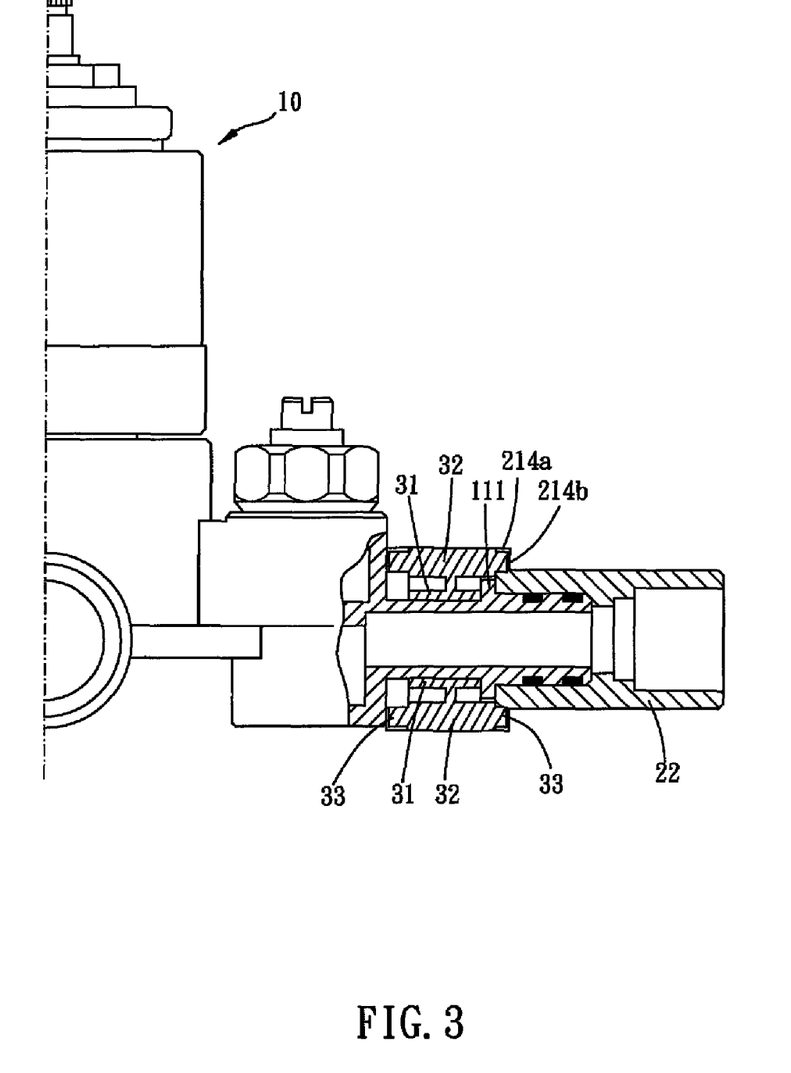
FIG. 3 is a partial side cross-sectional view of the FIG. 2.
Figure 4:
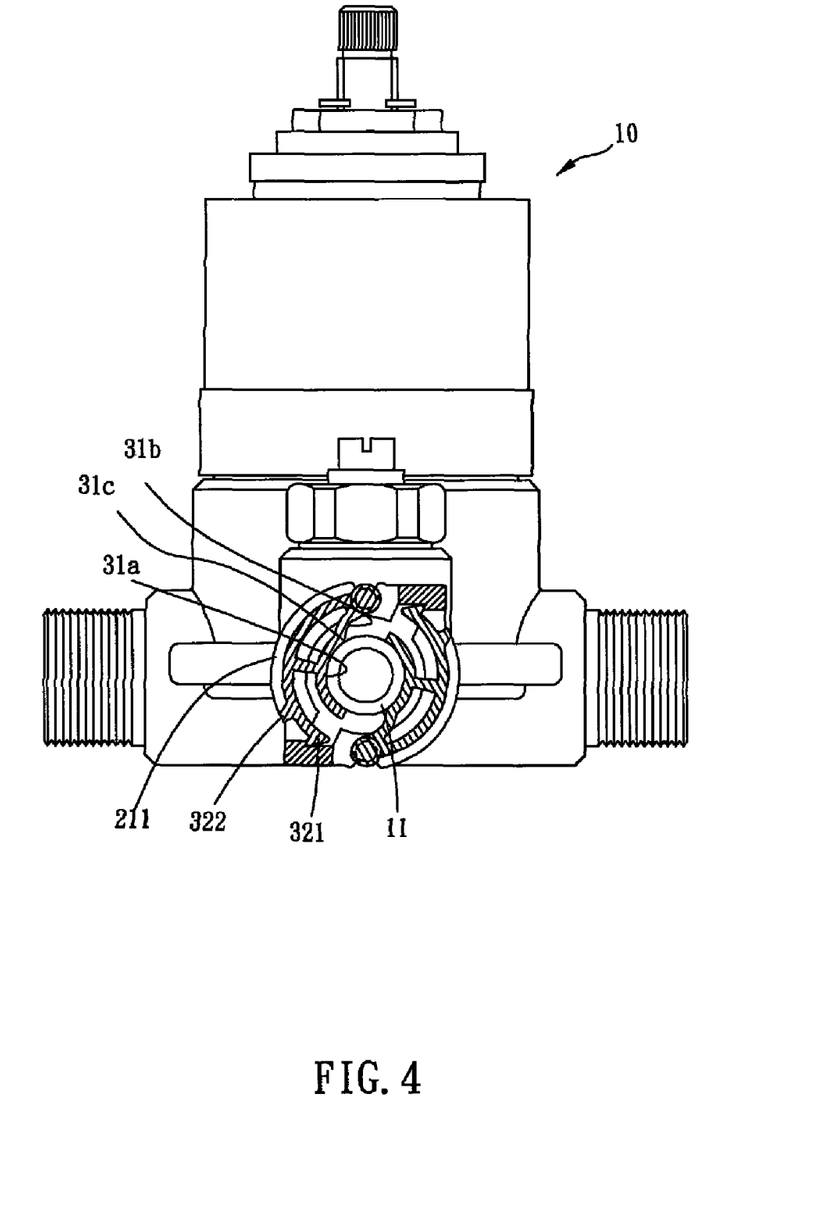
FIG. 4 is a partial front cross-sectional view of the FIG. 2.

When users want to connect the present invention to the male adapter 11, first of all, the male adapter 11 inserts to the axial hole of the female adapter. Preferably, an end of the male adapter inserts into the connecting tube till the blocking rim 111 abuts an end of the connecting tube, as shown in FIG. 3. Furthermore, the pivot members of the retainers are positioned in the predetermined position of one of the pair of engaging recesses 214. The retainers 30 are capable of pivoting about an axis with respect to the joint portion respectively. The retainers pivot between a clamping position and a spreading position. When the retainers are located in the clamping position, the retainers 30 are located in one of the openings 213 respectively. The inner arms 31 engage the male adapter 11 together. At the present time, the first concave surface 31a is leaned against an outer surface of the male adapter 11 tightly. The hook portions 321 hook in one of the limiting grooves 212a respectively.

Figure 5:
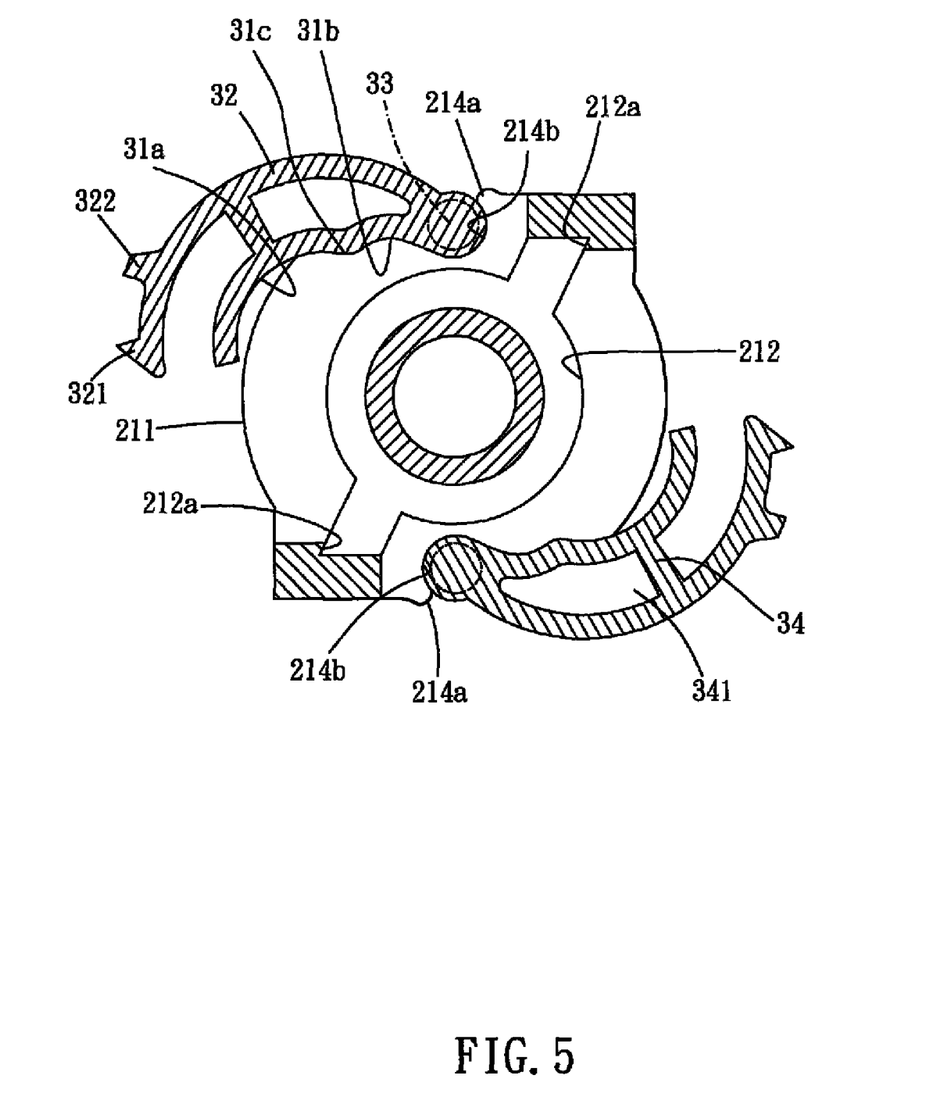
FIG. 5 is a partially enlarged drawing in accordance with the first embodiment of the present invention.

When users want to detach the male adapter 11 from the present invention, press the retainers so that the hooks 321 may disengage from the limiting grooves 212a respectively. Thereafter, users can push the retainers upward with the bump 322 and pivot to the spreading position, as shown in FIG. 5, so that the inner arm 31 may separate from the male adapter 11. At the same time, the male adapter 11 can be taken out. In the other words, due to the first and the second arc section of the inner arm have the same curve direction, but eccentric, especially the second concave surface of the second arc section is located at the side of the second arc section where is away from the outer arm. When the retainer pivots toward the spreading position, the inner arm can pass through the male adapter because of the second arc section. Whereby the inner arm may not be blocked by male adapter or rub with the male adapter so that the inner arm may not pivot to the spreading position smoothly.

Figure 6:
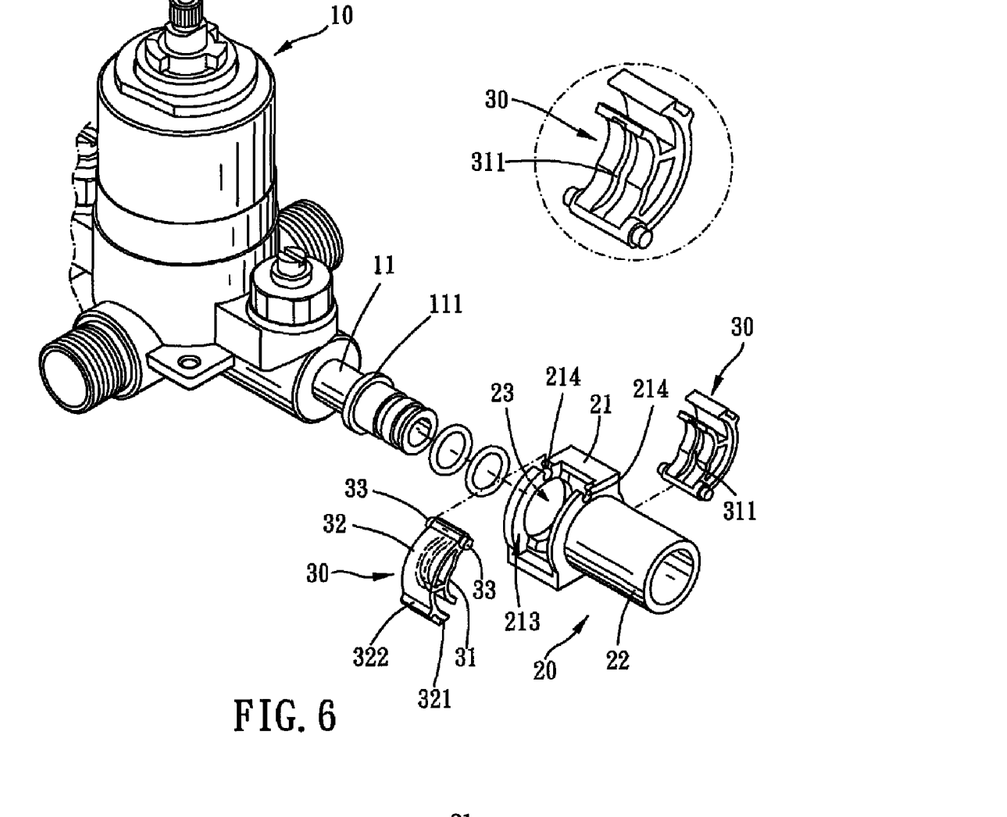
FIG. 6 is a breakdown drawing in accordance with the second embodiment of the present invention.
Figure 7:
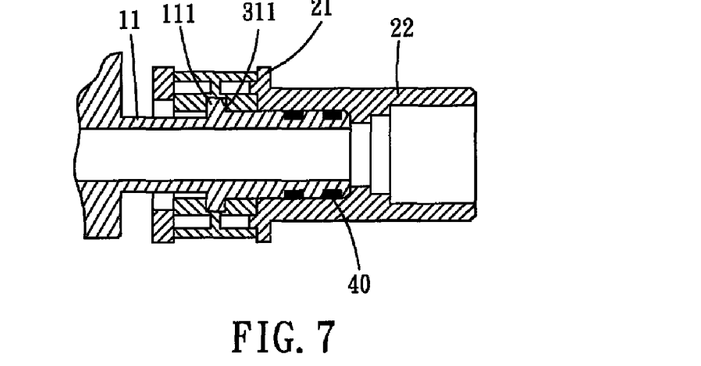
FIG. 7 is a partial side cross-sectional view of the second embodiment of the present invention.

Please refer to FIG. 6 and FIG. 7, in the second embodiment, the inner arms are formed with a channel respectively. Each channel 311 extends from the fixed end of the inner arm to a distal end of the inner arm. When each retainer is in the clamping position, the blocking rim 111 is positioned in predetermined positions of the channels 311 so that the retainers not only clamp the male adapter, but fix the male adapter in the axial hole firmly, the male adapter cannot slide from back and forth because of the channels. When the retainers pivot to the spreading position, the male adapter can be remove easily so as to further improve the prior art's problem that the male has got to move to some particular angle in other to remove from the quick connector.

Figure 8:
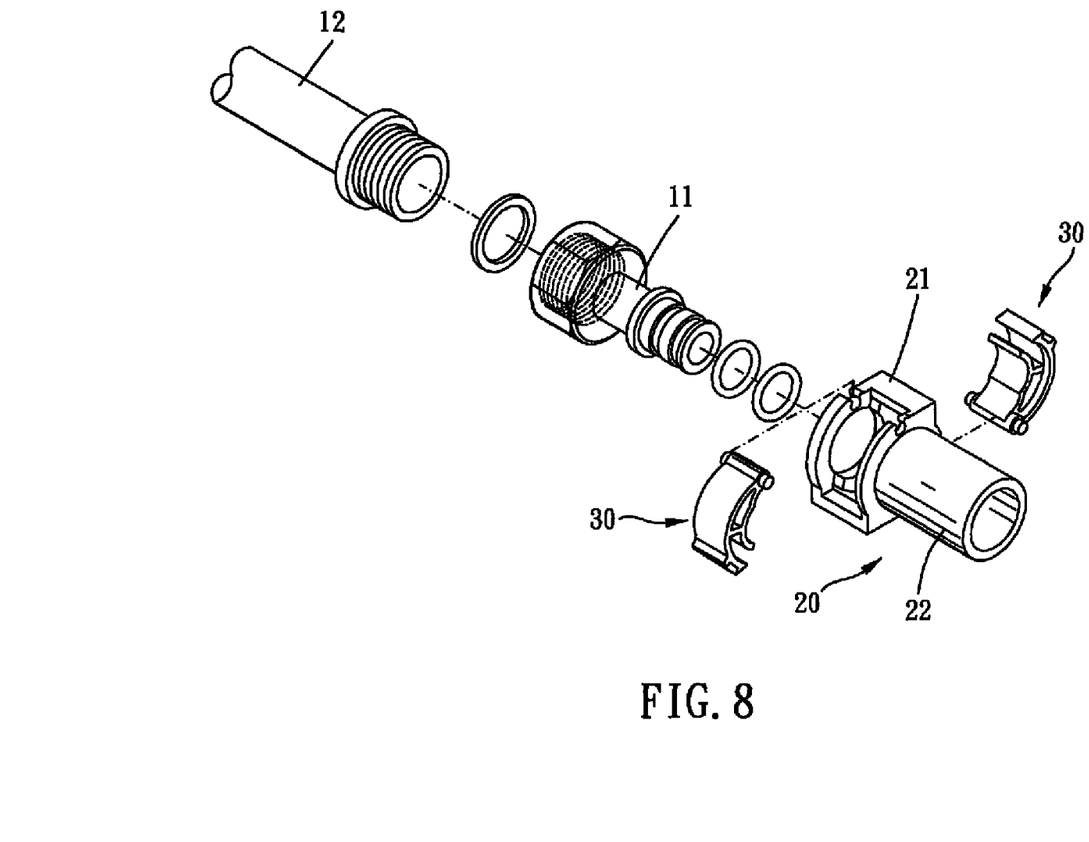
FIG. 8 is a breakdown drawing in accordance with the third embodiment of the present invention.

Please refer to FIG. 8, in the third embodiment of the present invention, the male adapter is not formed on the apparatus integrally. The apparatus has a tube 12 additionally. The tube 12 has a threaded section. One end of the male adapter inserts into the axial hole of the female adapter 20, the other end of the male adapter engages on the threaded section of the tube 12.

Figure 9:
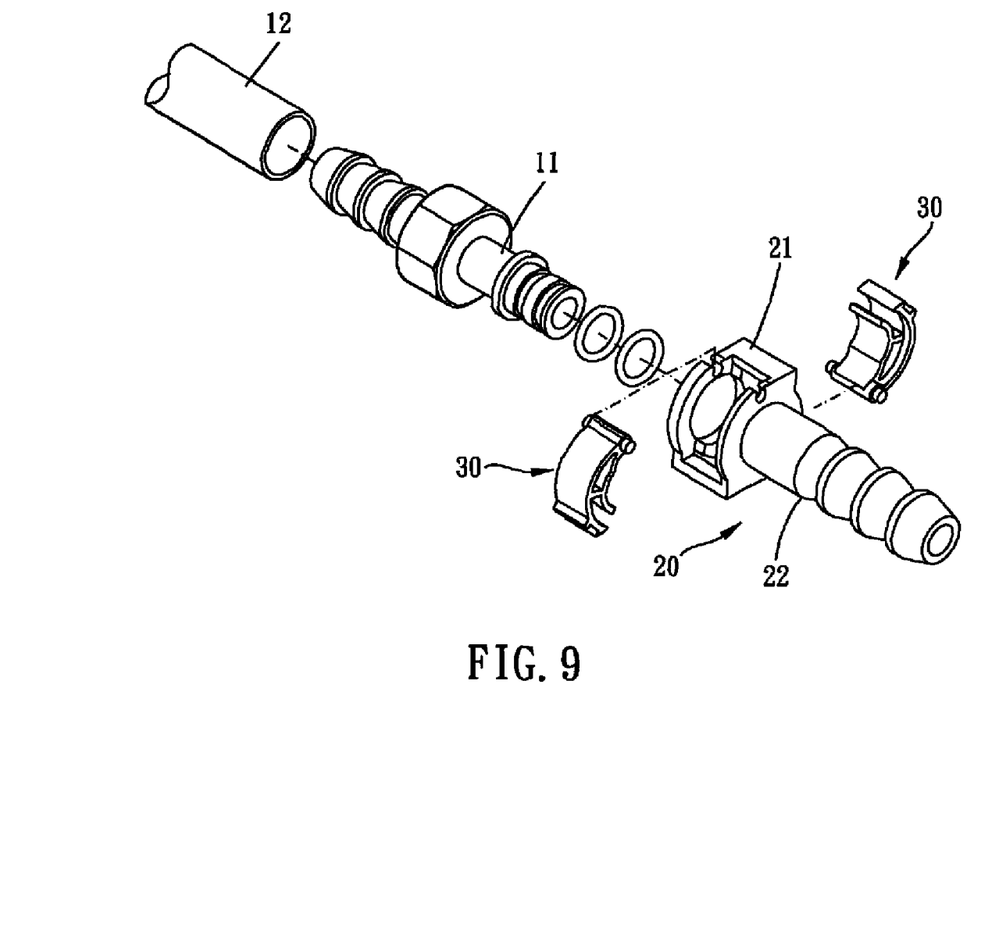
FIG. 9 is a breakdown drawing in accordance with the fourth embodiment of the present invention.

Please refer to FIG. 9, the fourth embodiment of the present invention, the tube 12 is elastic, such as a rubber hose or a plastic hose. The outer surface of one end of the male adapter 11 is formed with several first pyramidal structures narrowing down toward the same direction and to be connected to each other. The tube 12 can cover the other end of the male adapter 11 direct. Whereby the first pyramidal structures prevent the tube 12 from slipping out of the male adapter 11. The outer surface of the connecting tube 22 of the female adapter is formed with several second pyramidal structures narrowing down toward the same direction and to be connected to each other. The additional pipe is elastic so that it may cover the connecting tube 22 direct. Whereby the second pyramid structures prevent the additional pipe from slipping out of the connecting tube 22.

To sum up, the present invention can accomplish the purpose of connecting the male adapter to the present invention fast and tightly with the pivotable retainers. Besides, the male adapter 11 has two seals 40 preventing gas or liquid from leaking. Moreover, the outer arm has the bump so that the retainer is able to be disengaged from the limiting groove easily and fast, and the retainer can pivot to the spreading position.

It should be noted that an outer diameter of the pivot member 33 is as wide as an inner diameter of the broad section 214b, after the pivot member 33 passes through one of the narrow section 214a, the pivot member 33 is positioned in a predetermined position of one of the broad section 214b. In the other words, when each retainer installs in the female adapter, the retainer is fixed in the engaging recess 214 so that the retainer may not get out from the engaging recess. When the present invention isn't used for the male adapter to connect thereto yet, each retainer 30 can't separate from the engaging recess 214, whereby each retainer would not be lost easily.

What is claimed is:

1. A quick connector, being adapted for a male adapter to connect thereto, the quick connector comprising:
a female adapter, having a joint portion at one end thereof, the female adapter being formed with an axial hole, the axial hole being adapted for the male adapter inserting therein, the joint portion having an outer contour and an inner contour, the joint portion being formed with an opening, the opening extending radially and passing through the outer contour and the inner contour so that the opening is communicated with the axial hole;
wherein, the inner contour of the joint portion has at least a limiting groove; and at least a retainer, being pivotally disposed on the joint portion, the retainer comprising an inner arm and an outer arm, the outer arm comprising a hook portion;
wherein, the retainer is capable of pivoting about an axis with respect to the joint portion, the retainer pivots between a clamping position and a spreading position;
when the retainer is located in the clamping position, the retainer is located in the opening of the joint portion, the inner arm engaging the male adapter, the hook portion hooking in the limiting groove;
when the hook portion is away from the limiting groove, the retainer being capable of pivoting to the spreading position so that the inner arm is separated from the male adapter;
wherein the inner arm is formed with a first arc section and a second arc section, the first arc section has a first concave surface at a side of the first arc section which is away from the outer arm, the second arc section has a second concave surface at a side of the second arc section which is away from the outer arm, the first and the second concave surfaces are eccentric so that a protrusive portion is formed between the first and the second arc sections, the protrusive portion extends away from the outer arm, when the inner arm engages the male adapter, the first concave surface leans against an outer surface of the male adapter tightly.

2. The quick connector of claim 1, wherein the outer contour of the joint portion is formed with at least a pair of engaging recesses, the pair of engaging recesses is communicated with the opening of the joint portion, the retainer comprises a pair of pivot members, the pair of pivot members is positioned in a predetermined position in the engaging recesses.

3. The quick connector of claim 2, wherein each engaging recess has a narrow section and a broad section, the narrow section is communicated between the broad section and the outer contour of the joint portion, an outer diameter of the pivot member is as wide as an inner diameter of the broad section, after the pivot member passes through one of the narrow section, the pivot member is positioned in a predetermined position in one of the broad section.

4. The quick connector of claim 2, wherein the pair of pivot members is located between a fixed end of the outer arm and a fixed end of the inner arm.

5. The quick connector of claim 1, wherein the outer arm of the retainer comprises a bump, the bump is protrusive from a side of the outer arm which is away from the inner arm.

6. The quick connector of claim 1, wherein the retainer comprises a plurality of connecting portions, the connecting portions are connected between the inner arm and the outer arm, at least a recess space is formed between any two of the connecting portions which are adjacent to each other.

7. The quick connector of claim 1, wherein the inner arm is formed with a channel, the channel extends from a fixed end of the inner arm to a distal end of the inner arm, the male adapter comprises a blocking rim, when the retainer is in the clamping position, the blocking rim is positioned in a predetermined position of the channel.

8. The quick connector of claim 1, further comprising another retainer, the another retainer being pivotally disposed on the joint portion, the another retainer comprising an inner arm and an outer arm, the outer arm comprising a hook portion, the joint portion being formed with two openings and two limiting grooves, the openings respectively extending radially and passing through the outer contour and the inner contour so that the openings are communicated with the axial hole respectively, when the retainers are located in the clamping position, the retainers being located in one of the openings respectively, the inner arms engaging the male adapter together, the hook portions hooking in one of the limiting grooves respectively.

9. The quick connector of claim 8, wherein the outer contour of the joint portion is formed with two pairs of engaging recesses, each pair of engaging recesses is communicated with one of the openings respectively, the retainers comprise a pair of pivot members respectively, each pair of pivot members is positioned in a determined position in one of the pair of engaging recesses.

* * * * *